United States Patent Office 3,507,283
Patented Apr. 21, 1970

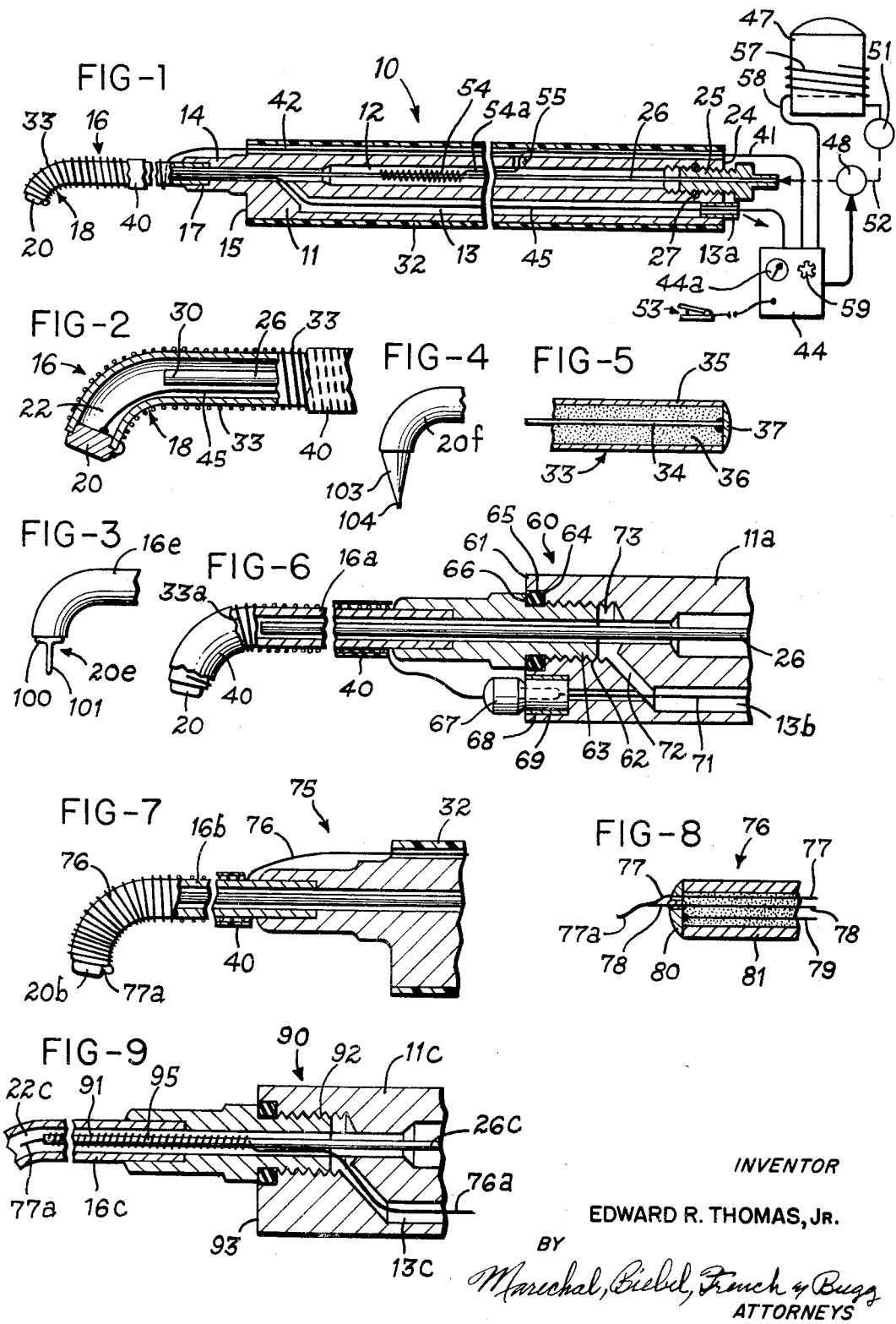

3,507,283
CRYOSURGICAL INSTRUMENT
Edward R. Thomas, Jr., Bethesda, Md., assignor to
Northwestern University
Continuation-in-part of application Ser. No. 447,124,
Apr. 12, 1965. This application Oct. 11, 1967, Ser.
No. 674,512
Int. Cl. A61b 17/36; F25d 3/00
U.S. Cl. 128—303.1         10 Claims

ABSTRACT OF THE DISCLOSURE

A surgical instrument having a probe whose temperature is precisely and automatically controlled to a desired hot or cold level. The desired temperature is produced by evaporating a liquid gas or by a coaxial heating wire, both regulated by an automatic control system therefor. The instrument is no larger than a pencil and to be used for cryosurgery or cauterization.

RELATED APPLICATION

This application is a continuation-in-part of my co-pending application Ser. No. 447,124, filed Apr. 12, 1965 and now Patent No. 3,439,680.

BACKGROUND OF THE INVENTION

The use of very cold temperatures has come into wide acceptance for many types of surgical operations. One such operation is cataract removal wherein the clouded lens is grasped and removed from the eye by the natural adhesion between the moist lens and a very cold probe. Additionally, research is also being conducted with cryosurgery in many other medical fields including the treatment of tumors and cancer.

Many of these instruments utilize a cryogenic fluid such as liquid nitrogen or Freon, which generates a very cold temperature when the liquid evaporates into a gas. This evaporation takes place in a handpiece which includes a probe havng suitable associated apparatus for supplying the liquid gas to a point adjacent the tip of the probe, wherein it is sprayed, and evaporated to reduce the temperature of the probe. In many operations, it is necessary to control precisely the temperature of this tip beyond that which occurs by merely continuously spraying the liquid adjacent the tip. Moreover, it is frequently necessary to elevate the temperature of the tip to defrost it to remove the ice ball which forms during the time the cold tip is exposed to the atmosphere.

In experimenting with cancer tissues and in other research, it is necessary to regulate precisely the temperatures so that the results of a specific temperature can be compared with that of another warmer or colder temperature, and so that different techniques can be tried with the instrument.

SUMMARY OF THE INVENTION

Accordingly, this invention provides a pencil-like handpiece for a combination cryosurgical and cauterization system which includes automatic means for precisely controlling the temperature of the tip without any substantial increase in the size or complexity of the handpiece or its probe. In one embodiment, a miniature coaxial heater wire is wrapped around the outside of the probe to accomplish the heating, whereas in another embodiment it is wrapped around the needle-like evaporation tube. An automatic control system is provided for sensing the temperature of the tip and controlling the flow of liquid gas and/or electrical current into the handpiece.

BRIEF DESCRIPTION OF THE DRAWINGS

FIG. 1 is a sectional view through the instrument in accordance with the invention;

FIG. 2 is an enlarged view of the probe partally broken away to illustrate the interior thereof;

FIGS. 3 and 4 are fragmentary views of other probe configurations which can be used with the system of FIG. 1;

FIG. 5 is an enlarged sectional view of the coaxial electrical conductor;

FIG. 6 is a sectional view of another embodiment of the invention;

FIG. 7 is a view simlar to FIG. 6 showng another embodiment of the invention;

FIG. 8 is an enlarged sectional view similar to FIG. 5 showing another embodiment of the electrical conductor; and FIG. 9 is an enlarged sectional view similar to FIG. 6.

DETAILED DESCRIPTION OF THE DRAWINGS

Referring to FIGS. 1–3, the small diameter handpiece or instrument 10 is easily held in the hand of the surgeon in substantially the same manner as a pen or pencil. The handpiece 10 consists of an elongated body 11 of metal or plastic material having the inlet and outlet passages 12 and 13 extending axially therethrough with the enlarged boss 14 extending from the left-hand end 15 of the body 11. A tubular probe 16 is fitted into the counterbore 17 in the boss 14 and extends axially from the body 11 and has a curved end portion 18 sealed by the metal tip 20 to define a closed evaporation chamber 22 (FIG. 2) inside of the tubular probe 16. This probe is preferably made of metal which can be autoclaved for sterilization by conventional methods.

The right-hand end 24 of the body 11 is internally threaded to receive the complementary threaded insert 25 which has a small diameter supply tube 26 rigidly secured thereto in communication with the small passage therein. An O-ring 27 is provided around the insert 25 to insure that liquid gas cannot leak between the insert 25 and the adjacent portion of the body 11. The expansion tube 26 extends through the entire passage 12 and into the probe 16, as shown in FIG. 2, with the discharge end 30 thereof closely spaced from the tip 20 in the evaporation chamber 22. A plastic insulating cover 32 surrounds the body 11 to protect the hand of the surgeon from the cold temperatures of the handpiece, and this cover can be a heat shrinkable polytetrafluoroethylene which can be autoclaved.

The coaxial electrical wire 33 forms an important part of this invention and is utilized to apply heat to the outer surface of the probe 16 to raise the temperature of the probe 16 and the tip 20 for maintaining a precise temperature, for defrosting the tip 20 or for raising the temperature to coagulate tissue as in cauterization. As shown in FIG. 5, this conductor includes a relatively small central or inner conductor 34, which is preferably of Nichrome, inserted into the tubular outer conductor 35 which may be of stainless steel, copper, or other suitable conductor. The inner and outer conductors 34 and 35 are separated by a magnesium oxide insulation 36 so that these conductors are electrically separated to avoid shorting. At one end of the wire, metal end 37 is provided for sealing the end of the outer conductor 35 and electrically interconnecting the inner and outer conductors 34 and 35.

The diameter and resistance of the inner conductor 34 is selected so that when a preset electrical current flows through the inner conductor 34, the end 37 and the outer conductor 35, the resistance in the inner conductor 34 causes the temperature to be elevated causing the entire wire 33 to heat up. Because the inner wire is sealed and separated from the atmosphere, it can be heated to a higher temperature than it normally could in the presence of oxygen which would create oxidation. It is possible to manufacture the conductor through a wide range of diameters, for example, the outer diameter of the outer conductor can be .062 inch and the diameter of the inner conductor can be .031 inch.

The wire 33 is wound around the outside surface of the proble 16 and secured thereto by soldering or other conventional means so that there is no relative movement between the conductor and the probe. An insulating cover 40 is provided around the outer surface of the probe 16 except in the area of the tip 20 to protect, among other things, the surgeon's hands from the hot and cold temperatures of the probe 16. The number of windings of the heater wire 33 around the probe 16 is dependent upon the amount of heating required and can be determined by one skilled in the art. There is no reason to insulate electrically the wire from the probe 16, since the heat is generated by the inner conductor 34 which cannot electrically short through the outer conductor 35 except through the end 37.

The leads 41 to the wire 33 extend through the small notch 42 in the outside surface of the body 11 inside of the cover 32 to a suitable control system 44 which includes an automatic rheostat for regulating the flow of electrical current therethrough. This control system also senses the temperature of the tip 20 through the thermocouple wire 45 which extends through the exhaust passage 13, the probe 16, and is connected to the tip 20, as shown in FIG. 2. Liquid gas for the instrument 10 is supplied to the supply 20 from the pressurized tank 47, and the control valve 48 is automatically positioned by the control system 44. The on-off valve 51 in the conduit 52 can be operated by the foot of the surgeon through the foot actuator 53 connected to the control system 44 to initiate operation of the instrument by permitting flow of the liquid to the supply tube 26.

A heater wire 54 connected to the control system 44 by the lead wire 54a is used to heat the tube 26 through which the refrigerant is supplied to raise the temperature thereof and increase the rate of evaporation to cool the tip 20 much faster than would otherwise occur. The wire 54 may be of the same construction as the wire 33, and the lead wire extends from the passage 26 through the fluid tight connector 55 into the groove 42. The exact position that this wire is wrapped around the tube 26 is not critical although it is preferred closer to the discharge end of the tube 26 to decrease the time lag between its energization and additional cooling of the tip 20.

The heater coil 57 surrounds the container 47 and has its lead wire 58 connected to the control system 44 for increasing the temperature of the liquid gas in the container 47. This heating causes partial evaporation of the liquid to increase the pressure in the container, and this pressure serves to force the liquid from the container when the appropriate valves 48 and 51 are opened by the system 44.

In operation, when the surgeon desires to perform a cryosurgical operation or to otherwise use the instrument, the temperature desired at the tip 20 is set on the control system 44 by adjusting the control handle 59. Then the valve 51 is opened manually, and since the instrument will be below the temperature desired, the control system 44 opens the control valve 48 and permits liquid gas to flow through the needle-like supply tube 26. The liquid flows through this tube and is sprayed in the expansion chamber 22 of the probe 16 to cool the tip 20. The evaporated gas then flows through the probe 16 on the outside of the tube 26 into the exhaust passage 13 and is vented from the instrument usually through a tube 13a which leads to a point remote from the instrument 10.

Because the temperature is well below the desired temperature as set by the control handle 59, the system 44 energizes both heaters 54 and 57 to increase the temperature and pressurization of the liquid gas for more rapid flow through the tube 26 and more rapid evaporation.

The temperature of the tip 20 is continually sensed through the thermocouple 45, and the refrigerant continues to flow into the tube 26 and be expanded adjacent the tip 20 until the temperature set on the control system 44 is reached. At this point, the control system automatically disconnects the heater 54. Should the temperature sink below the set temperature, the system 44 connects the heater wire 33 to the source of electrical current which flows through the inner conductor 34, the end 37, and the outer conductor 35 to heat the inner wire 34 and thus the entire wire 33. Since this conductor surrounds the probe 16, the probe likewise is heated to raise the temperature of the tip 20.

Should the surgeon desire a sufficiently hot tip 20 for cauterization, an appropriate switch on the pedal 53 is depressed, causing all flow of liquid to be terminated and the wire 33 to to heated. The heat flows to the tip 20 until it reaches a predetermined temperature as displayed on the indicator 44a (FIG. 1) at which time the cauterization can be performed. Should cooling again be required it is merely necessary to again depress the cooling switch in the pedal 53 to commence the operation described above. When the tip is to be defrosted, the surgeon depresses the defrost switch on the pedal 53 (FIG. 1) causing the control system 44 to close the valve 48 and supply maximum current to the heater 33 and thus quickly raise the temperature of the tip 20 to at least room temperature where the ice ball on the tip will drop off.

Another embodiment of the instrument 60 is shown in FIG. 6 wherein the probe 16a can be removed from the body 11a for replacement with a probe of different configuration or for any other reason such as cleaning the instrument. Accordingly, the left-hand end 61 of the body 11a has a threaded bore 62 therein adapted to receive the threaded nipple 63 on the end of the probe. An O-ring 64 is provided in the counterbore 65 adjacent the bore 62 to seal between the shoulder 66 of the probe 16a and the body 11a to prevent the escape of gases therebetween. The probe 16a is otherwise similar to that shown in FIGS. 1–3 except that the heater wire 33a has a male connector 67 on one end thereof which fits into the female connector 68 supported in the bore 69 in the end of the body 11a. The electrical leads 71 for the female connector 68 extend through the exhaust passage 13b, as shown. In addition, the exhaust passage 13b communicates with the interior of the probe 16a through the short tapered passage 72 which leads to the space 73 adjacent the inlet to the probe. This embodiment is identical in operation to that described above, and accordingly no description of the operation is given.

A further embodiment of the instrument 75 is shown in FIGS. 7 and 8 wherein the heater wire 76 includes three inner conductors 77, 78 and 79. The conductors 77 and 78 are of dissimilar metal to form a thermocouple which passes the end 80 of the wire 76 and have their extreme ends connected at 77a to complete the thermocouple. This connected end 77a is disposed adjacent the tip 20b to sense the temperature thereof and transmit the same to the control system 44. The other inner connector 79, the end 80, and the outer conductor 81 operate in substantially the same manner as described above and the wire is wrapped around the outside surface of the probe 16b, as previously described. As the tip 20b changes in temperature, the current flow through the thermocouple conductors 77 and 78 will vary thus indicating the change to the control system 44. The operation of this instrument is otherwise identical to that described above in connection with FIG. 1.

Another embodiment of the instrument 90 is illustrated in FIG. 9 wherein the probe can be removed without requiring the disconnection of the heater wire 91. Thus, the probe 16c is received in the bore 82 in the left-hand end 93 of the body 11c in a manner similar to that described above in connection with FIG. 4. The heater wire 76a which is identical to the wire 76 described above extends through the exhaust passage 13c, is wrapped around and secured to the end portion 95 of the supply tube 26c so that the probe 16c can be removed and replaced without disturbing the electrical heater wire. The number of turns of the wire 76a on this tube is again dependent upon the types of liquid gases being utilized, and the other conditions which relate to the amount of heating required. The extreme ends 77a of the conductor are disposed in the chamber 22c for sensing the temperature therein.

In operation of this embodiment, the liquid gas flows into the expansion chamber 22c through the tube 26c, as described above. When heating is necessary to regulate the temperature, the electrical current is automatically connected to the wire 76a and the heating thereof proceeds. The heat travels from convection and conduction to the tip 20c of the probe whose temperature is then elevated to defrost the tip or perform cauterization as desired.

An important advantage of this instrument is that the heat can be applied during the time the liquid gas is flowing through the tube 26c so that, when the gas reaches the end portion 95 of this tube, it is heated slightly and thus is closer to the boiling point when it is sprayed from the end of the tube. The heat absorbed by evaporation of the gas is primarily the result of the expansion process rather than the increase in the temperature of the liquid to the boiling point. Thus, by applying heat and raising the liquid to the boiling point, more efficient evaporation occurs in the expansion chamber in that all of the evaporation tends to occur adjacent the tip 20c rather than some of the liquid flowing through the exhaust.

Referring to FIG. 3, another embodiment of a tip 20e is illustrated with this configuration being designed primarily for cauterization. It has a flat plate 100 on the end of the probe 16e with the needle-like metal projection 101 in the center thereof. Both hot and cold temperatures are conveyed to the end of the projection 101 by conduction. The probe is otherwise identical to those described above and can be made as a permanent unit (FIGS. 1, 7 or 9) or a removable unit (FIG. 6). Similarly the embodiment of a tip 20f shown in FIG. 4 is identical to FIG. 3 except that a conical projection 103 with a pointed end 104 is used in lieu of the projection 100.

Accordingly, the invention has provided a combination cryosurgical system having a heating system which does not require any substantial amount of space and therefore does not detract from the size of the instrument. This heater may include a thermocouple which allows the temperature of the tip of the instrument to be held at a precise temperature, and a suitable control system is provided for regulating the flow of liquid into the instrument. The heater can also be used to defrost the tip to remove any ice ball that may form thereon or for any other reason it is desired to heat the tip. While a specific form of instrument has been shown, the heating system can obviously be utilized with other types of instruments which are used for surgery, research, or for any other use. Likewise, the control system can be constructed by one skilled in the art from many commercially available components when given the information disclosed herein.

What is claimed is:

1. A surgical instrument for use in subjecting parts of the human body to extreme temperatures comprising, a pencil-like handpiece having parallel inlet and outlet passages therein, an elongated hollow probe on the downstream end of said handpiece in alignment with said inlet passage, a tip on said probe, a small diameter tube having one end in communication with said inlet passage for receiving the flow of liquid therefrom, said tube extending axially into said hollow probe and having its other end terminating in the area of said tip so that the liquid gas flowing from said tube is sprayed into said probe adjacent said tip wherein it boils to cool said tip, an exhaust passage defined between the outside of said tube and the inside of said probe for flow of evaporation of liquid from said space, means in said handpiece connecting said exhaust passage with said outlet passage so that gases are expelled from said probe through said handpiece, means for connecting said inlet passage to a source of liquid gas under pressure, and coaxial heater means associated with said hollow probe including a tubular conductor, an inner conductor in said tubular conductor spaced therefrom by insulation means, said conductors having their ends interconnected so that at least one of said conductors is heated when an electrical current flows through said conductors to thereby elevate the temperature of said probe.

2. A surgical instrument as defined in claim 1 wherein said heater means is wrapped around the outside of said probe.

3. A surgical instrument as defined in claim 2 wherein said control means includes temperature sensing means for continually sensing the temperature of said tip.

4. A surgical instrument as defined in claim 1 wherein automatic control means are provided to regulate the flow of liquid gas into said small diameter tube and the electrical current flowing through said heater means to maintain the temperature of said tip at a preselected level.

5. A surgical instrument as defined in claim 1 wherein said inner conductor is a nickel chromium wire and said insulation means is magnesium oxide.

6. A surgical instrument as defined in claim 1 wherein said probe is releasably secured to one end of said handpiece, and a releasable connector interconnects electrical conductor means in said handpiece and said heater means.

7. A surgical instrument as defined in claim 1 wherein said heater means surrounds said small diameter tube inside said probe and adjacent the outlet end of said tube.

8. A surgical instrument as defined in claim 7 wherein said probe is releasably secured to said handpiece and can be removed separately from said small diameter tube and said heater means for replacement.

9. A surgical instrument as defined in claim 1 wherein said heater means include thermocouple conductors in said tubular conductor, said thermocouple conductors leading to a temperature sensing association with said tip to transfer a temperature indication to said control means.

10. A surgical instrument as defined in claim 9 wherein said tip has a pointed end.

References Cited

UNITED STATES PATENTS 3,289,424 12/1966 Shepherd.
3,298,371 1/1967 Lee _____ 128—303.1

LAWRENCE W. TRAPP, Primary Examiner